March 24, 1953 — H. G. SCHOONENWOLF — 2,632,555
BIN UNLOADING APPARATUS
Filed May 20, 1949 — 6 Sheets-Sheet 1
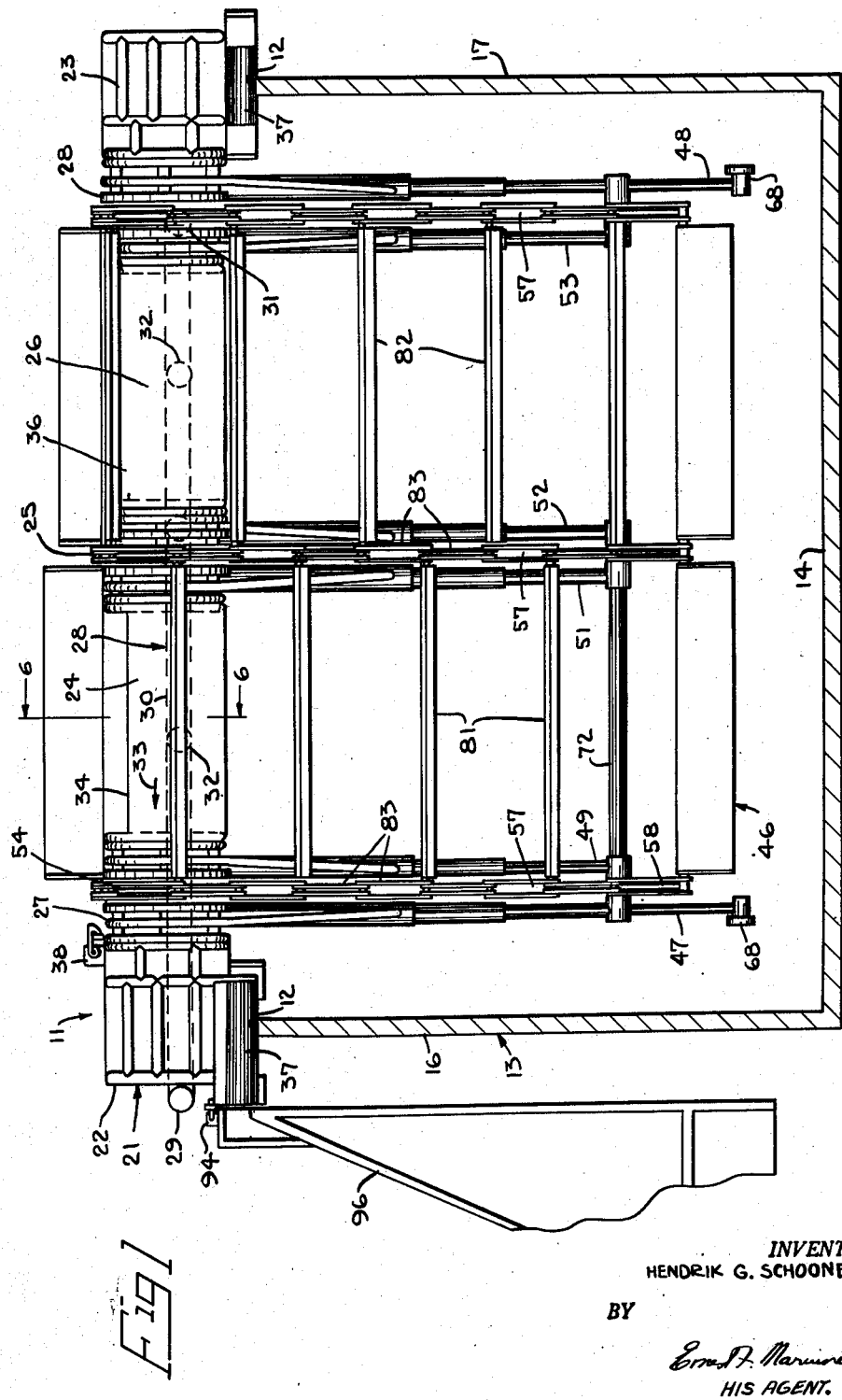
INVENTOR:
HENDRIK G. SCHOONENWOLF,
BY
HIS AGENT.

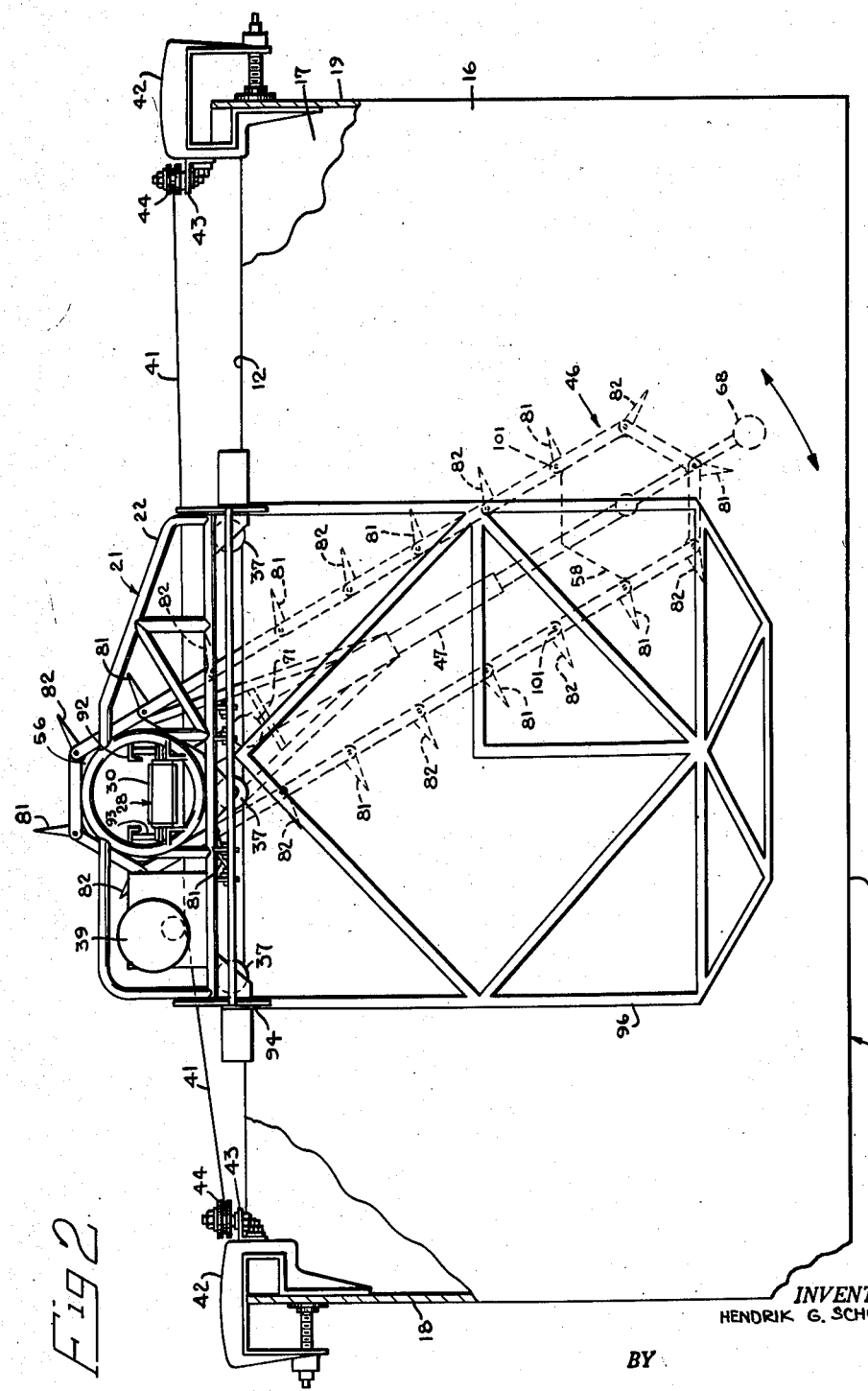

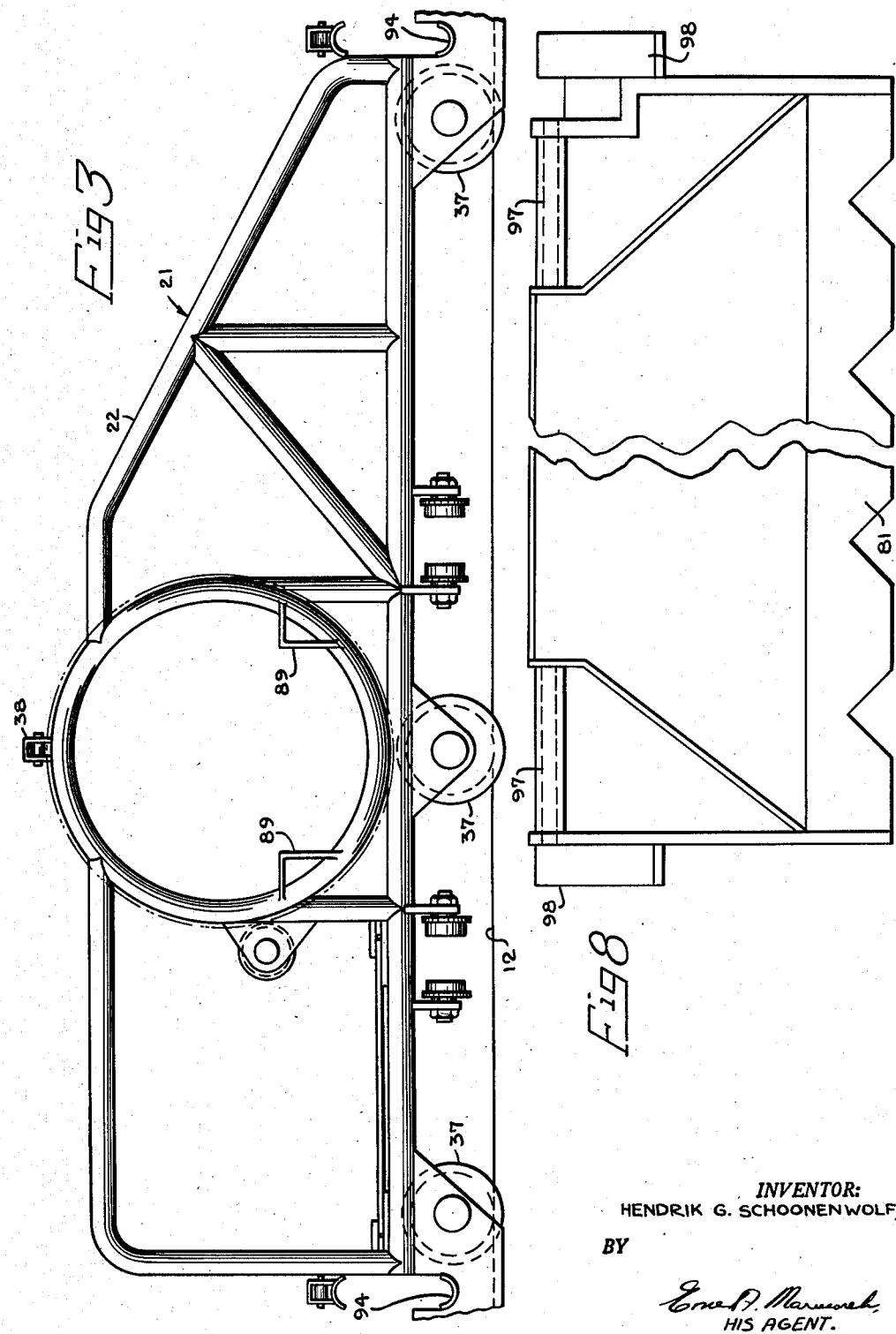

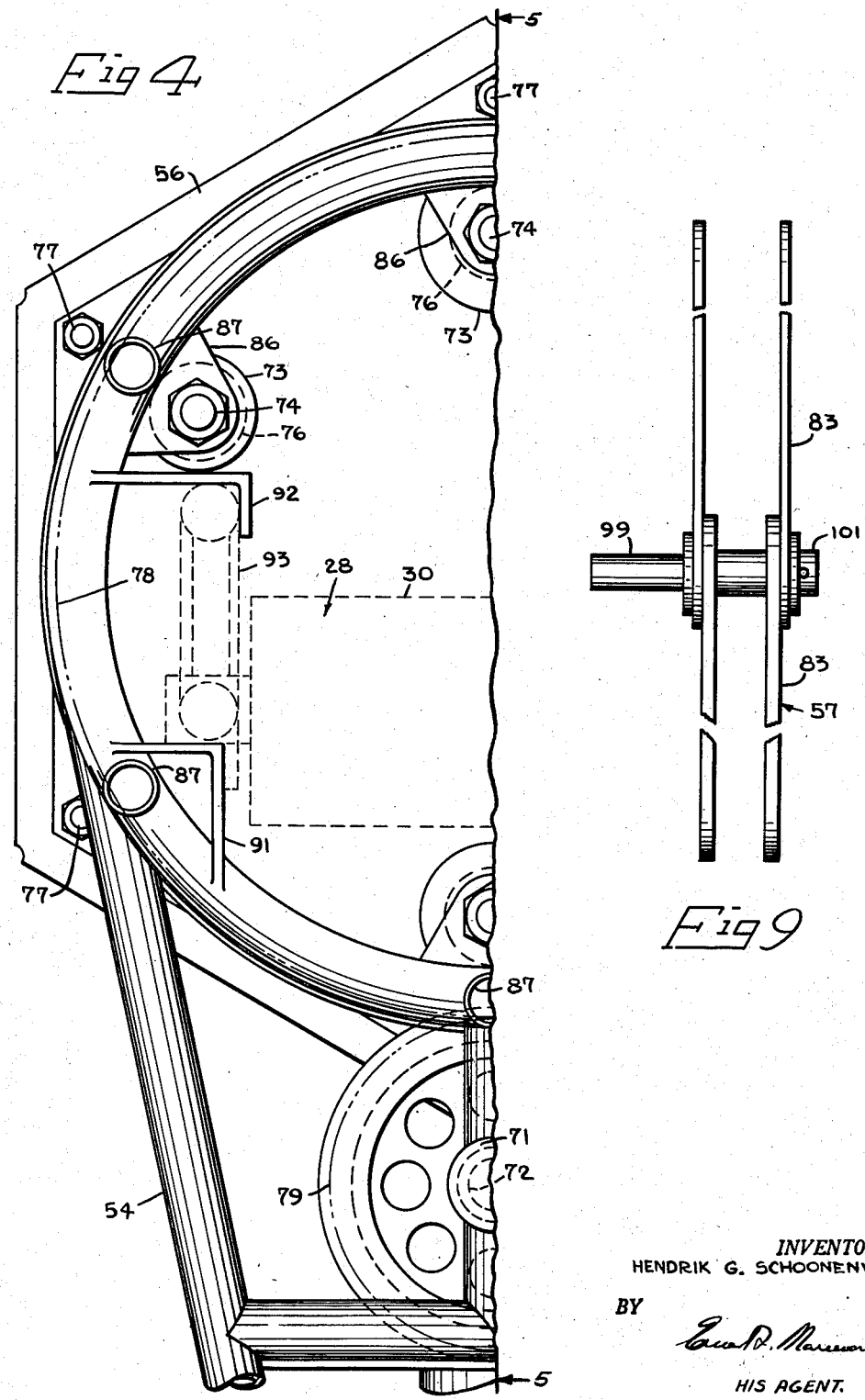

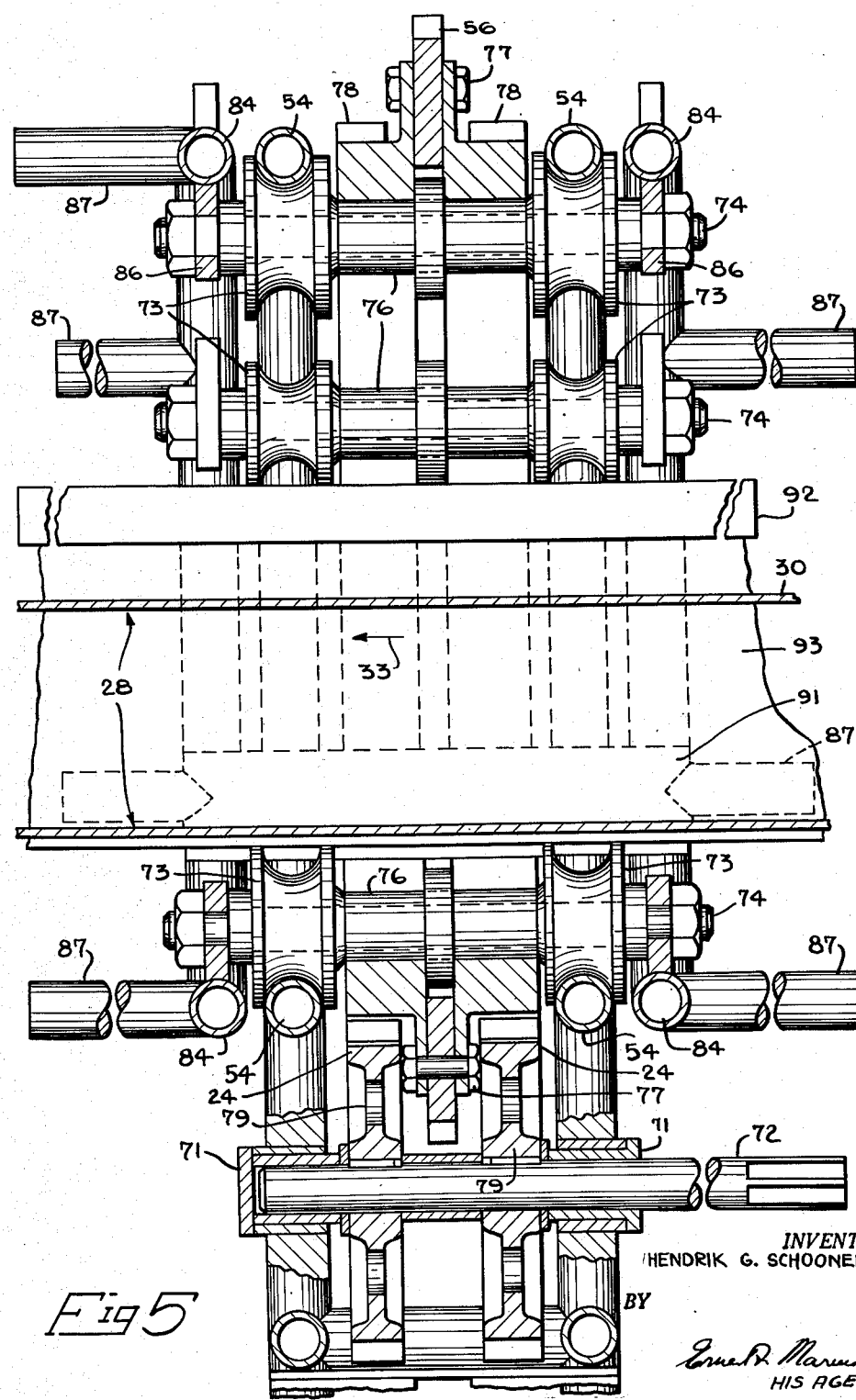

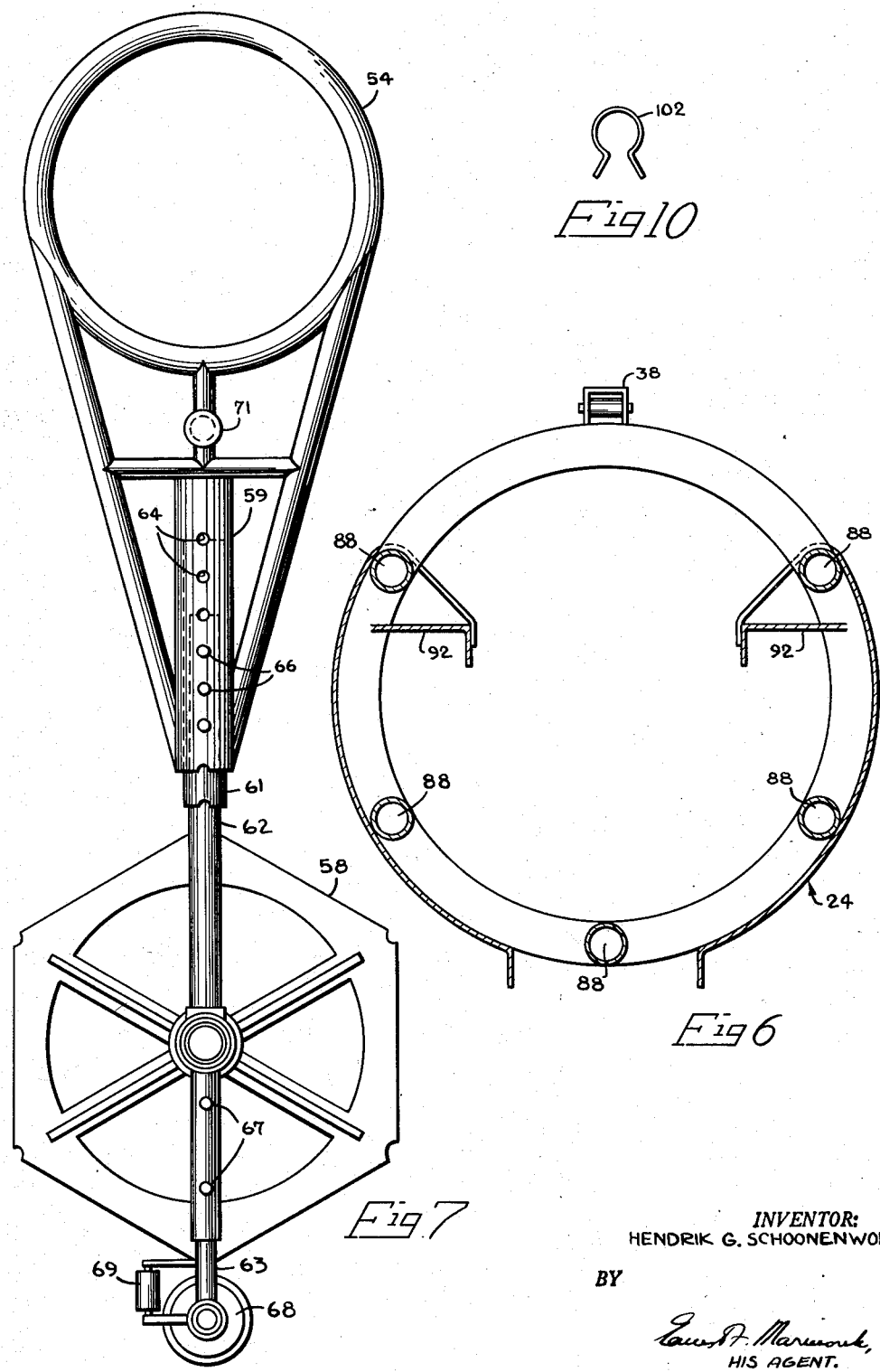

Patented Mar. 24, 1953

2,632,555

UNITED STATES PATENT OFFICE 2,632,555

BIN UNLOADING APPARATUS

Hendrik G. Schoonenwolf, Amsterdam, Netherlands

Application May 20, 1949, Serial No. 94,487
In the Netherlands May 20, 1948

6 Claims. (Cl. 198—94)

The invention relates to conveying machinery and relates more particularly to apparatus for unloading and moving piled material from open-top cars.

The invention has among its objects and advantages the provision of such an apparatus that is universally usable for various size cars and is capable of emptying substantially all of the material piled in a car.

Further objects and advantages of the invention will be set forth in part in the following specification and in part will be obvious therefrom without being specifically referred to, the same being realized and attained as pointed out in the claims hereof.

The foregoing and other objects of the invention will be best understood from the following description of exemplifications thereof, reference being had to the accompanying drawings, wherein:

Fig. 1 is a front elevational view, of an apparatus in accordance with the invention, but showing a car in cross-section;

Fig. 2 is a side elevational view thereof, partly in section;

Fig. 3 is a fragmentary elevational view, of a detail illustrated in Fig. 2, but showing it on a relatively enlarged scale;

Fig. 4 is a fragmentary elevational view, of another detail illustrated in Fig. 2, also showing it on a relatively enlarged scale;

Fig. 5 is a sectional view, taken on line 5—5 of Fig. 4;

Fig. 6 is an enlarged fragmentary sectional view, taken on line 6—6 of Fig. 1;

Fig. 7 is an elevational view of a further detail illustrated in Fig. 2, also showing it on a relatively enlarged scale;

Fig. 8 is an enlarged fragmentary elevational view, of a carrier illustrated in Figs. 1 and 2;

Fig. 9 is an enlarged fragmentary elevational view of a plurality of interconnected links of a chain illustrated in Figs. 1 and 2; and Fig. 10 is a side elevational view of a clamp used in connection with the carrier of Fig. 8.

In carrying the invention into effect in one of the embodiments which has been selected for illustration in the accompanying drawings and for description in the specification, and referring more particularly to Figs. 1 and 2, there is provided an apparatus for moving material, generally indicated at 11. The apparatus 11 is suspended on the upper edge 12 of a box-car 13, having a bottom 14, and side walls 16, 17, 18 and 19. Material piled in the car 13 may be unloaded with the aid of the apparatus 11.

The apparatus 11 has a frame 21 that may, for instance, be of tubular construction as illustrated in Fig. 1, and comprises a frame end part 22, an opposite end part 23, adjacent middle parts 24 and 26, a center part 25, an intermediate part 27 between the middle part 24 and the end part 22, and an intermediate part 28 between the middle part 26 and the end part 23. To accommodate different cars with the same frame 21, the end frame part 23 and the intermediate frame part 28 are interconnected adjustably, for instance, by means of intertelescoping parts (not shown in detail); whereas the other end part 22 is connected to the intermediate part 27 adjoining the same by means of a releasable latch 38, as best shown in Figs. 1, 3 and 6.

The frame 21 is hollow, as best shown in Fig. 2, and supports on its interior an endless transport band 28 that is suspended between terminal rollers 29 and 31 and has intermediate its longitudinal ends guiding or supporting rollers 32. The band can be moved by a power drive (not shown) for movement of the upper band portion 30 in a direction of an arrow 33.

The middle frame parts 24 and 26 are open on top as indicated at 34 and 36 respectively, and material may be deposited on the upper portion 30 of the band 28, through the open top, as will be explained later on.

The frame 21 is provided with rollers 37 for traction on the edges 12 of two opposite walls of the car 13, for instance of the walls 16 and 17, and machinery is provided for moving the frame 21 in opposite directions between the other walls 18 and 19. The rollers 37 are very wide, as best shown in Fig. 1, to suspend the frame 21 on cars of various widths.

A drum 39 is mounted on the frame 21 and is operable by power means (not shown) to revolve in opposite directions. A pulling element such as a cable 41 encircles the drum 39 and extends to the side walls 18 and 19 of the car 13. A clamp 42 is mounted on each of the walls 18 and 19, and each clamp 42 carries a longitudinal member such as an angle iron 43 that supports a roller 44 to which roller the cable 41 is secured. Rotation of the drum 39, therefore, will move the frame 21 towards one of the walls 18 and 19, depending on the direction of rotation of said drum.

A conveyor system, such as a structure generally indicated at 46, is provided between the intermediate frame parts 27 and 28. As best shown in Figs. 1, 2, 4 and 7, there are provided a plurality of, for instance, six spacers, namely, two outer spacers 47 and 48, and four inner spacers 49, 51, 52 and 53. Each two spacers form a pair, namely the spacers 47 and 49 between the parts 27 and 24, the spacers 51 and 52 at the center part 25, and the spacers 48 and 53 between the parts 26 and 28.

Referring now to Figs. 4, 5 and 7, each spacer has a circular portion 54 that encircles the frame 21, and each two adjoining spacers, that form a pair, carry therebetween and concentrically with said portion 54 a rotatable driving sprocket wheel 56. The sprocket wheel may, for instance, be of hexagonal shape, and it is apertured to surround the frame 21 and thereby the band 28 and carries an endless conveyor element such as a chain 57.

A similar sprocket wheel or idler wheel 58 is mounted between said two adjoining spacers of the parts at the opposite ends thereof to cooperate with said first named sprocket wheel 56, to suspend therebetween, to tension, and to move the chain 57. The sprocket wheel 58 may also be of hexagonal shape.

A chain is thus suspended by the cooperating spacers 47 and 49, another chain 57 between the spacers 51 and 52, and a third chain 58 between the spacers 48 and 53. It will be understood that the number of chains may be increased or decreased as specific design may require, and no limitation is intended thereby by the description of three chains as pointed out in the claims hereof.

The spacer portion 54 carries a series of sliding telescoping tubes, such as the sleeves 59, 61 and 62; and also each of the spacers 47 and 48 has at the end a rod 63 that is slidably engaged in the sleeve 62. The outer sleeve 59 is provided with a series of apertures 64 for adjustably securing the position of the sleeve 61 sliding therein, and pins 66 may be inserted through said aperture 64 to cooperate with corresponding apertures (not shown) in the sleeve 61. The location of the sleeve 62 relative to the sleeve 61 wherein it slides is similarly selectively adjustable. Likewise, the rod 63 is adjustably secured in the sleeve 62, by means of removable pins 67. The rod 63 carries at its lower end a roller 68, for the purpose of making contact with the car bottom 14 during operation, to shield the chain from impact, and the rod 63 also carries a second roller 69 at right angle to the roller 68 for use in start of the operation, as will be referred to later on. The spacer portion 54, furthermore carries a bearing 71, wherein there is journalled a shaft 72. The spacer portion 54 of each spacer may be of tubular shape as illustrated in the drawings, or of any other suitable shape.

Referring now to Figs. 4 and 5, each of the spacer portions 54 is carried by a series of rollers 73 that are mounted on bolts 74 arranged along the periphery of a circle concentric with the spacer portions 54 and the sprocket wheel 56. On each bolt 74, between each two of the aligned rollers 73 of adjoining spacers, there is provided a roller 76. The sprocket wheel 56 surrounds said rollers 76, but is not in direct contact therewith and is secured, by means of bolts 77 to two gears 78 that are in rolling contact with the rollers 76. The sprocket wheel 56 is thus on each side in contact with a gear 78 and revolvable therewith and arranged to be driven thereby.

The shaft 72 carries two pinions 79, each of which is in mesh with a gear 78, and the shaft 72 as shown in Fig. 1 is interconnected to the gearings 78 and 79 of the other spacers. Thereby, the movements of all the chains 57 coincide.

As best shown in Fig. 5, the spacer portions 54 are rotatable about the rollers 73, and hence about the frame 21 in order to tilt or swing the spacers about the frame to and from a vertical position, including a horizontal position wherein the roller 69 makes contact with one of the angle irons 43 of the clamp 42. This swinging movement enables unloading of the entire pile within the wagon 13, as will be explained below.

A series of blades or carriers 81 is mounted between the chains of the frame part 24, and a series of similar carriers 82 is carried by the chains of the frame portion 26. Each carrier 81 is offset against the carriers 82 for one link 83 of the middle chain. This offsetting permits proper spacing of the material discharged on to the band 28.

The bolts 74 for each sprocket wheel 56 of the parts 25, 27 and 28, are interconnected at both ends by means of rings 84 that carry lugs 86, and these lugs are secured to the bolts 74. The rings 84 furthermore carry a series of pins 87 that rest in corresponding sleeves 88 of the adjoining sections, such as the sections 22, 24, 26 and 23 in order to provide connections between these parts.

Each pair of spacers, namely, the spacers 47 and 49, 51 and 52, 53 and 48, can thus swing about the frame 21 independent of the chain movements.

The frame end parts 22 and 23 are provided with angle irons 89 in the lower part of the circular opening as best shown in Fig. 3, and the parts 27, 25 and 28 have similarly positioned angle irons 91 (Fig. 4); and the parts 27, 24, 25, 26 and 28 furthermore have angle irons 92 (Figs. 4 and 6) placed in the upper portion of the circular opening. All of these angle irons are welded to a fixed part of the frame. Longitudinal strips 93 are secured to said angle irons and provide a guiding frame for the transport band 30, and at the same time serve to stiffen the entire frame 21.

The frame part 22 is provided with clamp members 94 for carrying a platform structure 96.

Returning to the material carriers 81 and 82, and referring particularly to Figs. 8, 9 and 10, each of the carriers, for instance the carrier 81 (Fig. 8) is provided with opposite sleeves 97 and with cams 98. The sleeves 97 are arranged to receive extensions 99 of the pins 101 that interconnect the links 83 of the chain 57 (Fig. 9). These extensions 99 preferably are made of unequal length for the various chains (not shown in detail), in order to permit insertion of the carriers 81 between two chains, and clips 102 (Fig. 10) may be used in connection with the extensions 99 to prevent longitudinal sliding of the carriers relative to the extensions, for securing the carriers between the chains.

The cams 98 are so formed that they will abut against the small sides of the chain links 83 in order to project the carriers 81 (and 82) from the chain links, as best shown in Fig. 2. This projecting of the carriers serves during unloading of the material off the car 13 and also during discharge through the open top 34 and 36 on to the band 28, as the carriers are at a predetermined angle relative to the chain links 83 for such unloading and discharge.

The operation of the apparatus is as follows: Initially, the spacers are rotated until the rollers 69 of each of the spacers 47 and 48 make contact with one of the angle irons 43, thereafter the cable 41 is actuated by the drum 39 over the frame 21 away from the walls sufficiently to release the contacts: then the chain drives are started and the unloading of the material will begin, with the carriers 81 and 82 discharging the material through the open tops 34 and 36 on to the upper portion 30 of the endless band 28. That part of the pile lying against the end wall 19, for instance, may be discharged in the position of the conveying structure 46 shown in Fig. 2 by moving the frame 21 towards the wall 19. The remainder of the pile disposed near the wall 18, for instance, could not be reached in this position of the structure 46 as the oblique position of the conveyor structure would prevent the carriers reaching that material; therefore, the pins 67 of the sleeve 62 may be removed, allowing the rod 63 to slide further into the sleeve 62 and thereafter the spacers may be swung past the vertical position for unloading the remainder of the material.

The roller 68 that is disposed at the lower end of the spacers 47 and 48 serves to make contact with the car bottom 14 to prevent damage to the sprocket wheels 58 and chains 57. The spacers may be adjusted in length by means of the pins 66, and the chains may be adjusted accordingly by removal or addition of links.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to secure by Letters Patent, is as follows:

1. In an apparatus for moving material, to be used in connection with a support, having: a frame including means for suspension on said support and an endless longitudinally extending transport band horizontally supported on said frame for receiving material and being movable in longitudinal direction for transporting material, in combination with, a conveyor structure supported by said frame and being swingable relative thereto and comprising two endless conveyor elements of selectively variable length being spaced from each other and being interconnected for tied driving movement, said elements surrounding said band, and extending therefrom transversally of the direction of movement of said endless band, a tiltable carrier extending between said elements and being movable therewith to convey material over said band, and means for tilting said carrier above said band vertically to discharge therefrom material by gravity onto said band.

2. In an apparatus for moving material, to be used in connection with a support, having: a frame including means for suspension on said support and an endless longitudinally extending transport band substantially horizontally supported on said frame for receiving material and being movable in longitudinal direction for transporting the material, in combination with, a conveyor structure comprising at least two opposite swingable spacers, a chain support on each spacer and including a revoluble apertured driving sprocket wheel surrounding said transport band and a revoluble driven sprocket wheel aligned with said driving sprocket wheel, a chain suspended on the sprocket wheels of each spacer, said driven sprocket wheels of said spacers being in driving interconnection for chain movement, tiltable carriers between said chain chains and being movable therewith to convey material over said band, and means for tilting each carrier above said band, vertically, to discharge therefrom material onto said band, by gravity.

3. In an apparatus for moving material, to be used in connection with a support, having: a frame including means for suspension on said support, and an endless longitudinally extending transport band horizontally supported on said frame for receiving material and being movable in longitudinal direction for transporting material, in combination with, a conveyor structure supported by said frame and being swingable relative thereto and comprising two endless conveyor elements of selectively variable length being spaced from each other and being interconnected for tied driving movement, said elements surrounding said band, adjustable means operable for holding and tensioning said conveyor elements, tiltable carriers extending between said elements and being movable therewith to convey material over said band, and means for tilting each carrier above said band vertically to discharge therefrom material by gravity on to said band.

4. In an apparatus for moving material as claimed in claim 3, together with, said suspension means being operable for movement of said frame on said support, and driving means extending to said frame for movement therewith.

5. In an apparatus as claimed in claim 3, in combination with, said frame having a hollow portion open on top surrounding said transport band, said structure and conveyor elements being disposed around said hollow portion for discharge of material by said carriers through said open top on to said transport band.

6. In an apparatus as claimed in claim 3, in combination with, longitudinal strips laterally disposed adjacent either side of said transport band and interconnected to said frame for stiffening the latter and providing a confinement frame for the former to cooperate therewith for material transporting.

HENDRIK G. SCHOONENWOLF.

REFERENCES CITED

The following references are of record in the file of this patent:

UNITED STATES PATENTS

| Number | Name | Date |
|---|---|---|
| 1,027,669 | Richards | May 28, 1912 |
| 1,361,832 | Crilly | Dec. 14, 1920 |
| 1,368,081 | Webb | Feb. 8, 1921 |
| 1,426,706 | Beattie | Aug. 22, 1922 |

FOREIGN PATENTS

| Number | Country | Date |
|---|---|---|
| 686,371 | France | Apr. 14, 1930 |